(12) United States Patent
Yanagida et al.

(10) Patent No.: US 7,229,716 B2
(45) Date of Patent: Jun. 12, 2007

(54) NONAQUEOUS ELECTROLYTE SECONDARY BATTERY

(75) Inventors: Katsunori Yanagida, Itami (JP); Takao Inoue, Kobe (JP); Naoya Nakanishi, Kobe (JP); Atsuhiro Funahashi, Toyonaka (JP); Toshiyuki Nohma, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 667 days.

(21) Appl. No.: 10/673,350

(22) Filed: Sep. 30, 2003

(65) Prior Publication Data

US 2004/0062993 A1   Apr. 1, 2004

(30) Foreign Application Priority Data

Sep. 30, 2002   (JP) .............................. 2002-284740

(51) Int. Cl.
*H01M 4/58* (2006.01)
(52) U.S. Cl. ............... 429/231.8; 429/231.4; 429/330; 429/331; 429/332; 429/329
(58) Field of Classification Search ............ 429/231.8, 429/231.4, 330, 331, 332, 329
See application file for complete search history.

(56) References Cited

U.S. PATENT DOCUMENTS 5,352,548 A   10/1994  Fujimoto et al. ........... 429/197
5,626,981 A   5/1997   Simon et al. ............... 429/105
6,413,678 B1  7/2002   Hamamoto et al. ......... 429/332
2004/0126668 A1* 7/2004 Nishimura et al. ...... 429/231.4

FOREIGN PATENT DOCUMENTS

JP   8-45545   2/1996

* cited by examiner

*Primary Examiner*—Laura Weiner
(74) *Attorney, Agent, or Firm*—Kubovcik & Kubovcik

(57) ABSTRACT

A nonaqueous electrolyte secondary battery includes a positive electrode, a negative electrode comprising a graphite as a negative electrode active material, and a nonaqueous electrolyte including at least a saturated cyclic carbonic ester and containing a cyclic carbonic ester having a carbon-carbon double bond such that, when a content of the cyclic carbonic ester having a carbon-carbon double bond is x (g), a content of the graphite in the negative electrode is B (g), a specific surface area of the graphite is A ($m^2/g$), a size of the crystallite of the graphite in a direction of the c axis is Lc, and a size of the crystallite of the graphite in a direction of the a axis is La, a condition expressed by $$0.05 \times 10^{-2} \leq x/[A \times B \times 2Lc/(2Lc+La)] \leq 3 \times 10^{-2}$$

is satisfied.

16 Claims, 2 Drawing Sheets

NONAQUEOUS ELECTROLYTE SECONDARY BATTERY

FIELD OF THE INVENTION

The present invention relates to a nonaqueous electrolyte secondary battery comprising a positive electrode, a negative electrode including a graphite as a negative electrode active material, and a nonaqueous electrolyte. Especially, the invention relates to a nonaqueous electrolyte secondary battery having improved cycle life and output characteristics at a high rate when a graphite is used as the negative electrode active material.

BACKGROUND OF THE INVENTION

A nonaqueous electrolyte secondary battery having high electromotive force that comprises a nonaqueous electrolyte and utilizes oxidation and reduction of lithium has recently been used as one of new type high output and high energy density batteries.

In such nonaqueous electrolyte secondary batteries, a carbon material such as graphite, coke, and the like, capable of occluding and releasing lithium ion is commonly used. When high crystalline graphite is used, a nonaqueous electrolyte secondary battery having high energy density can be provided. Therefore, such graphite has recently been widely used.

It has been proposed that a vinylene carbonate derivative is added to the nonaqueous electrolyte in a nonaqueous electrolyte secondary battery comprising a graphite as the negative electrode active material to improve cycle characteristics (Japanese Patent Laid-open No. 8-45545).

It is believed that a vinylene carbonate derivative is reduced during the initial charge of the battery in which the graphite is used as the negative electrode active material to form a surface film on a surface of the negative electrode active material. The surface film prevents a side reaction, for example, decomposition of the nonaqueous electrolyte, and the like, to improve the cycle life of the battery.

However, there is a problem that the surface film formed on the surface of the negative electrode active material reduces output characteristics when the battery is discharged at high current.

OBJECT OF THE INVENTION

The present invention provides a solution to the problem described above in a nonaqueous electrolyte secondary battery comprising a positive electrode and a negative electrode which includes graphite as a negative electrode active material.

Stated differently, the present invention intends to prevent deterioration of output characteristics at high current caused by a surface film formed on the surface of the negative electrode active material and to obtain a nonaqueous electrolyte secondary battery having excellent cycle life and output characteristics by addition of a cyclic carbonic ester having a carbon-carbon double bond, for example, vinylene carbonate, and the like, to the nonaqueous electrolyte in the battery which includes graphite as the negative electrode active material.

SUMMARY OF THE INVENTION

A nonaqueous electrolyte secondary battery of the present invention includes a positive electrode, a negative electrode comprising a graphite as a negative electrode active material, and a nonaqueous electrolyte comprising at least a saturated cyclic carbonic ester and containing a cyclic carbonic ester having a carbon-carbon double bond such that, when a content of the cyclic carbonic ester having a carbon-carbon double bond is x (g), a content of the graphite in the negative electrode is B (g), a specific surface area of the graphite is A ($m^2$/g), a size of the crystallite of the graphite in a direction of the c axis is Lc, and a size of the crystallite of the graphite in a direction of the a axis is La, a condition expressed by $$0.05 \times 10^{-2} \leq x/[A \times B \times 2Lc/(2Lc+La)] \leq 3 \times 10^{-2}$$

is satisfied.

EXPLANATION OF ELEMENTS

Figure 1:
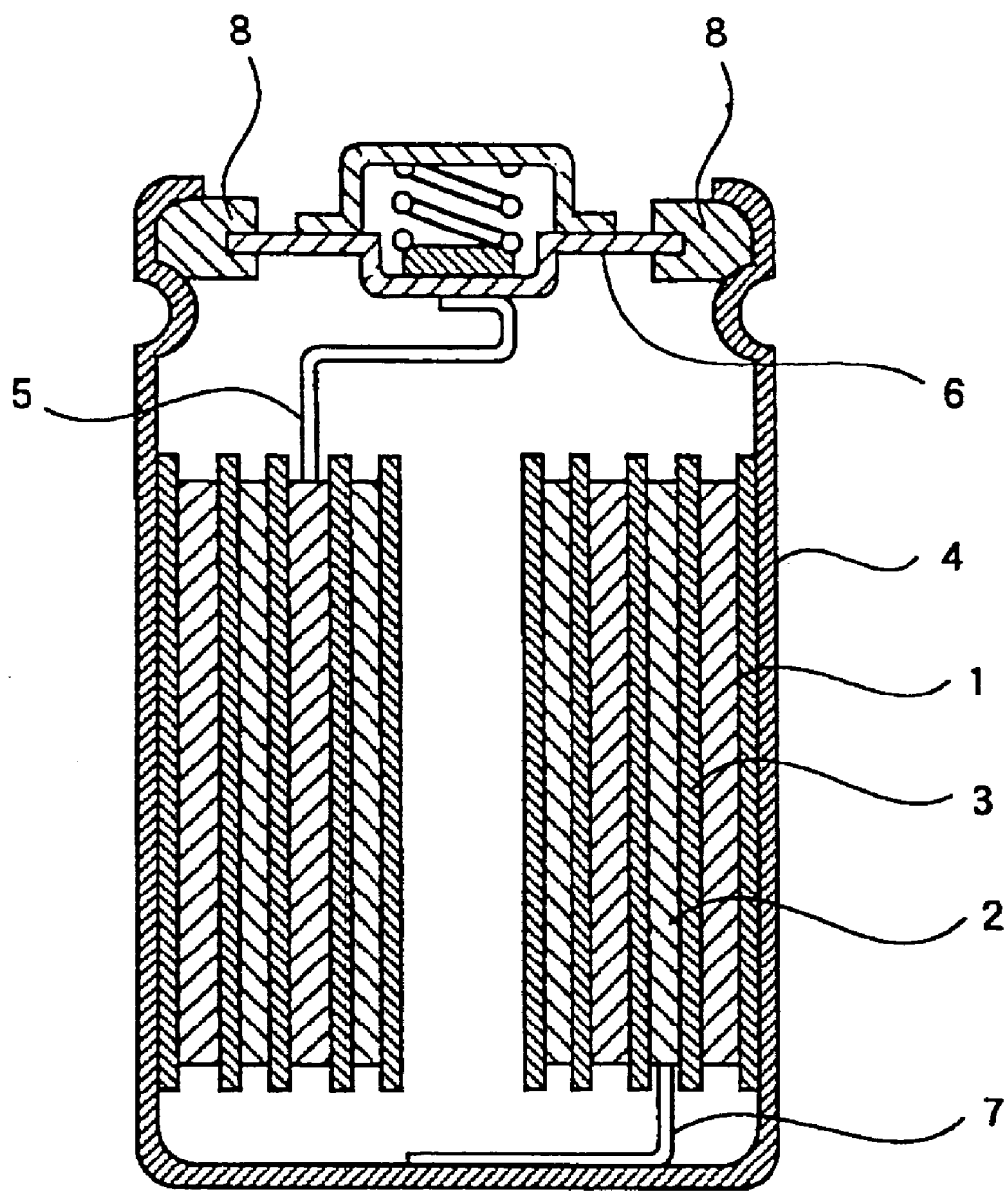
FIG. 1 is a cross section of the nonaqueous electrolyte secondary battery prepared in the Examples and Comparative Examples.

1: positive electrode
2: negative electrode
3: separator
4: battery can
5: positive electrode lead
6: positive electrode external terminal
7: negative electrode lead
8: insulation packing

DETAILED EXPLANATION OF THE INVENTION

The cyclic carbonic ester having a carbon-carbon double bond included in the nonaqueous electrolyte is reduced during the initial charge to form a surface film on a surface of the negative electrode active material. The surface film inhibits a side reaction of decomposition of the nonaqueous electrolyte to improve cycle life.

When graphite is used as the negative electrode active material, occluding and releasing of lithium ions are performed on edge planes of the graphite. Therefore, if the surface film formed on the edge planes is too thick, occluding and releasing of lithium ions on the edge planes are prevented and output characteristics at a high current are reduced.

When x/[A×B×2Lc/(2Lc+La)] is represented by "t", if "t" is in a range of $0.05 \times 10^{-2}$ and $3 \times 10^{-2}$, the thickness of the surface film formed on the edge planes is suitable and deterioration of output characteristics is prevented and cycle life is improved.

In the above-described expression, 2Lc/(2Lc+La) represents a ratio of edge planes area of the graphite to the surface area of the graphite, A×B×2Lc/(2Lc+La) corresponds to an area of the edge planes relative to the entire amount of graphite in the negative electrode. When an amount of the cyclic carbonic ester having a carbon-carbon double bond (x) added to the nonaqueous electrolyte is adjusted relative to the area of the edge planes of the entire amount of graphite to bring "t" in a range of $0.05 \times 10^{-2} \sim 3 \times 10^{-2}$, a suitable surface film thickness is formed on the edge planes to improve the cycle life of the battery and to prevent deterioration of output characteristics at a high current.

If "t" is smaller than $0.05 \times 10^{-2}$, the surface film formed on the edge planes of the graphite is too thin to sufficiently prevent decomposition of the nonaqueous electrolyte during charge and discharge and cycle life is reduced. However, if "t" is more than $3 \times 10^{-2}$, the surface film formed on the edge planes of the graphite is too thick, and output characteristics at a high current are deteriorated.

As the graphite of the present invention, it is preferably to have a spacing of the 002 plane ($d_{002}$) obtained by X-ray diffraction analysis in a range of 0.335~0.338 nm, and a size of the crystallite in the direction of the "c" axis (Lc) of at least 30 nm. The graphite can be coated with an amorphous carbon material.

If a graphite having a ratio ($I_{110}/I_{002}$) of peak strengths of the 002 plane ($I_{002}$) and the 110 plane ($I_{110}$) in a range of $5 \times 10^{-3}$~$15 \times 10^{-3}$ obtained by X-ray diffraction analysis is used as the graphite, discharge characteristics are further improved.

A graphite having R ($I_D/I_G$) obtained by Raman spectrometry in a range of 0.15~0.7 is preferably used.

R($I_D/I_G$) is a ratio of a peak strength at 1360 cm$^{-1}$ ($I_D$) to a ratio of a peak strength at 1580 cm$^{-1}$ ($I_G$) obtained by Raman laser spectroscopic analysis. The peak at 1580 cm$^{-1}$ is obtained from stacking structure having hexagonal symmetry close to a graphite structure, and the peak at 1360 cm$^{-1}$ ($I_D$) is obtained from an amorphous structure. As R($I_D/I_G$) becomes larger, the ratio of amorphous parts on the surface of the graphite becomes greater. When crystallinity on the surface of the graphite is small, a uniform surface film having excellent mobility of lithium ion can be formed by the cyclic carbonic ester having a carbon-carbon double bond included in the nonaqueous electrolyte. If R($I_D/I_G$) is at least 0.15, excellent low temperature characteristics are obtained. However, if R($I_D/I_G$) is greater than 0.70, the surface of the graphite is a very amorphous structure and charge and discharge efficiency is deteriorated.

As the cyclic carbonic ester having a carbon-carbon double bond, vinylene carbonate, 4,5-dimethyl vinylene carbonate, 4,5-diethyl vinylene carbonate, 4,5-dipropyl vinylene carbonate, 4-ethyl-5-methyl vinylene carbonate, 4-ethyl-5-propyl vinylene carbonate, 4-methyl-5-propyl vinylene carbonate, vinylethylene carbonate, and the like can be illustrated. A cyclic carbonic ester having a carbon-carbon double bond in a ring, especially vinylene carbonate, is preferable for obtaining a uniform and stable surface film having excellent mobility of lithium ions on the surface of the graphite.

As the saturated cyclic carbonic ester, ethylene carbonate, propylene carbonate, butylene carbonate, and the like, can be used alone or in combinations thereof. Especially, ethylene carbonate, propylene carbonate and a mixed solvent of ethylene carbonate and propylene carbonate is preferable. A concentration of the saturated cyclic carbonic ester is preferably in a range of 10~70% by volume in the nonaqueous electrolyte solvent.

In the nonaqueous electrolyte secondary battery of the present invention, a chain carbonic ester may be included in the nonaqueous electrolyte to reduce viscosity of the nonaqueous electrolyte and to improve discharge characteristics at room temperature or a low temperature. As the chain carbonic ester, dimethyl carbonate, ethyl methyl carbonate, diethyl carbonate, methyl propyl carbonate, ethyl propyl carbonate, methyl isopropyl carbonate, and the like, can be used alone or in combinations thereof.

A conventional nonaqueous electrolyte used for a nonaqueous electrolyte secondary battery can be added to the nonaqueous electrolyte. As the additional nonaqueous electrolyte, esters, for example, methyl acetate, ethyl acetate, propyl acetate, methyl propionate, ethyl propionate, γ-butyrolactone, and the like; ethers, for example, tetrahydrofuran, 2-methyl tetrahydrofuran, 1,4-dioxane, 1,2-dimethoxyethane, 1,2-diethoxyethane, and the like; nitriles, for example, acetonitrile, and the like; and amides, for example, dimethylformamide, and the like, can be used.

A known solute can be used as the solute to be dissolved in the nonaqueous electrolyte. A lithium compound, for example, LiPF$_6$, LiAsF$_6$, LiBF$_4$, LiCF$_3$SO$_3$, LiN(C$_l$F$_{2l+1}$SO$_2$)(C$_m$F$_{2m+1}$SO$_2$) (wherein l and m are integers of 1 or greater), LiC (C$_p$F$_{2p+1}$SO$_2$) (C$_q$F$_{2q+1}$SO$_2$) (C$_r$F$_{2r+1}$SO$_2$) (wherein p, q and r are integers of 1 or greater), and the like, can be used alone or in various combinations thereof. A concentration of the solute is preferably in a range of 0.1~1.5 mol/l, more preferably in a range of 0.5~1.5 mol/l.

As a positive electrode active material in the nonaqueous electrolyte secondary battery of the present invention, a transition metal oxide including lithium, for example, lithium cobalt oxide (LiCoO$_2$), lithium nickel oxide (LiNiO$_2$), lithium manganese oxide (LiMn$_2$O$_4$), and the like, can be used. If a mixture of a lithium-manganese composite oxide having a spinel structure, and represented by the formula Li$_x$Mn$_{2-y1}$M1$_{y2}$O$_{4+z}$ (wherein M1 is at least one element selected from the group consisting of Al, Co, Ni, Mg and Fe, x is $0 \leq x \leq 1.5$, y1 and y2 are $0 \leq y1 \leq 1.0$ and $0 \leq y2 \leq 0.5$, respectively, and z is $-0.2 \leq z \leq 0.2$) and lithium-nickel-cobalt-manganese composite oxide represented by the formula Li$_a$Ni$_b$Co$_c$Mn$_d$O$_2$ (wherein a is $0 \leq a \leq 1.2$, and b+c+d=1) is used, output characteristics of the nonaqueous electrolyte secondary battery are improved. If the lithium-manganese composite oxide and lithium-nickel-cobalt-manganese composite oxide are mixed in a ratio by weight of 20:80~80:20, the output characteristics are further improved.

DESCRIPTION OF PREFERRED EMBODIMENTS

EXAMPLE

Examples of a nonaqueous electrolyte secondary battery of the present invention are described below and are compared with those of comparative examples to show that an excellent cycle life is obtained and discharge characteristics at high rate discharge are also improved. It is of course understood that the present invention is not limited to these embodiments and that the present invention can be modified within the scope and spirit of the appended claims.

Example 1

In this Example, a cylindrical nonaqueous electrolyte secondary battery as shown in FIG. 1 was prepared using a positive electrode, a negative electrode and a nonaqueous electrolyte as described below.

[Preparation of Positive Electrode]

LiCoO$_2$ powder was used as a positive electrode active material. LiCoO$_2$ powder, carbon powder as a conductive agent, and polyvinylidene fluoride as a binder in a ratio by weight of 90:5:5 were mixed to prepare a positive electrode material mixture. N-methyl-2-pyrrolidone was added to the positive electrode material mixture to prepare a slurry. The slurry was coated on both sides of a positive electrode current collector of an aluminum foil and dried in a vacuum, and the combination was press rolled, and cut into a desired size to prepare a positive electrode.

[Preparation of Negative Electrode]

A natural graphite powder having a size of the crystallite in the a direction (La) of 220 nm and a size of the crystallite in the c direction (Lc) of 220 nm so that $2Lc/(2Lc+La)=0.67$, and a specific surface area (A) of 5.0 m$^2$/g was used as a negative electrode active material. The sizes of the crystallite were measured by a method provided by Committee 117 of the Japan Society for the Promotion of Science (INAGAKI, Michio, Tanso, 1963[36], 25).

The natural graphite powder, styrene-butadiene rubber as a binder and carboxymethylcellulose were mixed at a ratio by weight of 98:1:1 to prepare a negative electrode material mixture. Water was added to the mixture to prepare a slurry. The slurry was coated on both sides of a negative electrode current collector of a copper foil and dried in a vacuum, the combination was press rolled and cut into a desired size to prepare a negative electrode. The amount (B) of the natural graphite powder in the negative electrode was 6 g.

[Preparation of Nonaqueous Electrolyte]

Ethylene carbonate which is a saturated cyclic carbonic ester and diethyl carbonate which is a chain carbonic ester were mixed in a ratio by volume of 30:70. After 1 mol/l Lithium hexafluorophosphate (LiPF$_6$) was dissolved in the mixture, 0.17 g (x) of vinylene carbonate which is cyclic carbonic ester having a carbon-carbon double bond was added to prepare a nonaqueous electrolyte.

[Assembly of Battery]

A fine porous film of polypropylene as a separator 3 was inserted between the positive electrode 1 and the negative electrode 2 prepared above and was rolled spirally, and was placed in a battery can 4 as shown in FIG. 1. The nonaqueous electrolyte prepared above was poured into the battery can 4 and the can was sealed. The positive electrode 1 was connected to a positive electrode external terminal 6 through a positive electrode lead 5, and the negative electrode 2 was connected to the battery can 4 through a negative electrode lead 7. The battery can 4 and positive electrode external terminal 6 were electrically insulated by an insulation packing 8 to prepare a cylindrical battery having an outer diameter of 18.0 mm and a height of 65.0 mm.

$t=[A \times B \times 2Lc/(2Lc+La)]$ was calculated as $t=0.8 \times 10^{-2}$ as shown in Table 1.

Example 2

A battery of Example 2 was prepared in the same manner as in Example 1 except that 0.47 g (x) of vinylene carbonate was used. "t" of the battery of Example 2 was $2.2 \times 10^{-2}$ as show in Table 1.

Comparative Example 1

A battery of Comparative Example 1 was prepared in the same manner as in Example 1 except that vinylene carbonate was not added to the nonaqueous electrolyte. "t" of the battery of Comparative Example 1 was 0.

Comparative Example 2

A battery of Comparative Example 2 was prepared in the same manner as in Example 1 except that 0.85 g (x) of vinylene carbonate was used. "t" of the battery of Comparative Example 2 was $4.0 \times 10^{-2}$ as show in Table 1.

Each of the batteries of Examples 1 and 2 and Comparative Examples 1 and 2 was charged to 4.2 V at a current of 1200 mA and charging was continued at a constant voltage of 4.2 V for a total of 2.5 hours charge, and then was discharged to 2.75 V at a constant current of 400 mA. Battery capacity (Q) of each battery was measured. Each battery had a battery capacity of about 1600 mAh.

After each battery was charged for a total of 2.5 hours as described above, the battery was discharged to half of the battery capacity (Q) to prepare three batteries of each of Examples 1 and 2 and Comparative Examples 1 and 2 having 50% depth of discharge. The batteries were discharged at a discharge current (I) of 1200 mA, 2400 mA and 4800 mA for ten seconds to measure battery voltages (V).

I–V characteristics of the batteries of Examples 1 and 2 and Comparative Examples 1 and 2 were evaluated from discharge current (I) and battery voltage (V). A resistance (R) of each battery was obtained from a slope of an obtained straight line. $V_0$ of each battery was calculated from the following expression. The results are shown in Table 1.

$V=V_0-RI$

Figure 2:
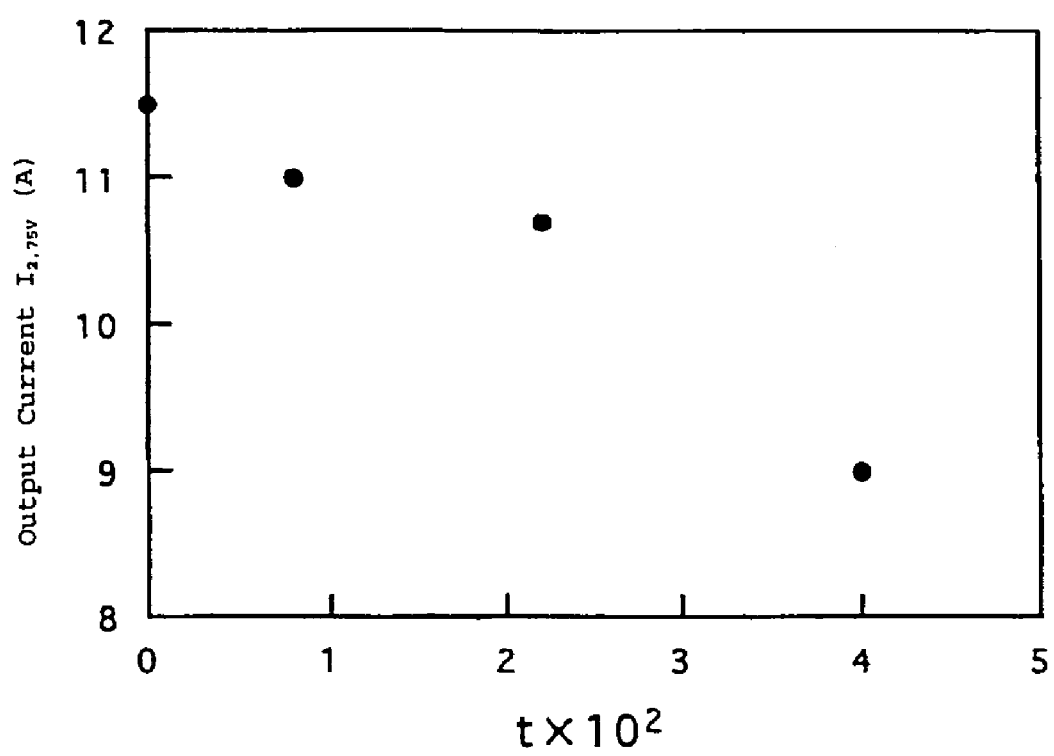
FIG. 2 shows relationships of t=x/[A×B×2Lc/(2Lc+La)] and output current, $I_{2.75V}$.

An output current $I_{2.75V}$ of each battery when each battery was discharged at 2.75 V was calculated by the following expression using R and $V_0$ obtained above. The results are shown in Table 1 and FIG. 2.

$I_{2.75V}=(V_0-2.75)/R$

TABLE 1

|  | t | R (Ω) | $V_O$ (V) | $I_{2.75V}$ (A) |
|---|---|---|---|---|
| Example 1 | $0.8 \times 10^{-2}$ | 0.0977 | 3.825 | 11.0 |
| Example 2 | $2.2 \times 10^{-2}$ | 0.1005 | 3.825 | 10.7 |
| Comparative Example 1 | 0 | 0.0936 | 3.826 | 11.5 |
| Comparative Example 2 | $4.0 \times 10^{-2}$ | 0.1193 | 3.824 | 9.0 |

As is clear from the results, the batteries of Examples 1 and 2 having "t" in a range of $0.05 \times 10^{-2} \sim 10^{-2}$ have greater output current, $I_{2.75V}$, than the battery of Comparative Example 2. That is, output characteristics of the batteries of Examples 1 and 2 were improved.

The battery of Comparative Example 1 in which vinylene carbonate was not added to the nonaqueous electrolyte has a large $I_{2.75V}$, but cycle life is significantly small as compared to the batteries of Examples 1 and 2, and Comparative Example 2.

ADVANTAGES OF THE INVENTION

A nonaqueous electrolyte secondary battery of the present invention comprising a negative electrode in which graphite is a negative electrode active material includes a cyclic carbonic ester having a carbon-carbon double bond in a nonaqueous electrolyte which forms a surface film on a surface of the negative electrode active material and the surface film inhibits a side reaction of decomposition of the nonaqueous electrolyte to improve cycle life.

In the present invention, a suitable thickness of surface film is formed on edge planes of the graphite to make it possible to improve output characteristics at a high current without deterioration of cycle life.

What is claimed is:

1. A nonaqueous electrolyte secondary battery comprising a positive electrode, a negative electrode comprising a graphite as a negative electrode active material, and a nonaqueous electrolyte comprising at least a saturated cyclic carbonic ester and containing a cyclic carbonic ester having a carbon-carbon double bond such that, when a content of the cyclic carbonic ester having a carbon-carbon double bond is x (g), a content of the graphite in the negative electrode is B (g), a specific surface area of the graphite is A ($m^2$/g), a size of the crystallite of the graphite in a direction of the c axis is Lc, and a size of the crystallite of the graphite in a direction of the a axis is La, a condition expressed by $$0.05 \times 10^{-2} \leq x/[A \times B \times 2Lc/(2Lc+La)] \leq 3 \times 10^{-2}$$

is satisfied.

2. The nonaqueous electrolyte secondary battery according to claim 1, wherein the cyclic carbonic ester having a carbon-carbon double bond has a double bond in a ring.

3. The nonaqueous electrolyte secondary battery according to claim 2, wherein the cyclic carbonic ester having a carbon-carbon double bond is vinylene carbonate.

4. The nonaqueous electrolyte secondary battery according to claim 2, wherein $d_{002}$ of the graphite is in a range of 0.335 to 0.338 nm as measured by X-ray diffraction analysis.

5. The nonaqueous electrolyte secondary battery according to claim 2, wherein $I_{110}/I_{002}$ of the graphite is in a range of $5 \times 10^{-3}$ to $15 \times 10^{-3}$ as measured by X-ray diffraction analysis.

6. The nonaqueous electrolyte secondary battery according to claim 2, wherein $I_D/I_G$ of the graphite is in a range of 0.15 to 0.7 as measured by Raman spectroscopy.

7. The nonaqueous electrolyte secondary battery according to claim 2, wherein the saturated cyclic carbonic ester in said nonaqueous electrolyte is at least one of ethylene carbonate, propylene carbonate, and butylene carbonate.

8. The nonaqueous electrolyte secondary battery according to claim 2, wherein said nonaqueous electrolyte contains chain carbonic ester.

9. The nonaqueous electrolyte secondary battery according to claim 8, wherein said chain carbonic ester is at least one of dimethyl carbonate, ethyl methyl carbonate, diethyl carbonate, methyl propyl carbonate, ethyl propyl carbonate, and methyl isopropyl carbonate.

10. The nonaqueous electrolyte secondary battery according to claim 1, wherein the cyclic carbonic ester having a carbon-carbon double bond is vinylene carbonate.

11. The nonaqueous electrolyte secondary battery according to claim 1, wherein $d_{002}$ of the graphite is in a range of 0.335 to 0.338 nm as measured by X-ray diffraction analysis.

12. The nonaqueous electrolyte secondary battery according to claim 1, wherein $I_{110}/I_{002}$ of the graphite is in a range of $5 \times 10^{-3}$ to $15 \times 10^{-3}$ as measured by X-ray diffraction analysis.

13. The nonaqueous electrolyte secondary battery according to claim 1, wherein $I_D/I_G$ of the graphite is in a range of 0.15 to 0.7 as measured by Raman spectroscopy.

14. The nonaqueous electrolyte secondary battery according to claim 1, wherein the saturated cyclic carbonic ester in said nonaqueous electrolyte is at least one of ethylene carbonate, propylene carbonate, and butylene carbonate.

15. The nonaqueous electrolyte secondary battery according to claim 1, wherein said nonaqueous electrolyte contains chain carbonic ester.

16. The nonaqueous electrolyte secondary battery according to claim 15, wherein said chain carbonic ester is at least one of dimethyl carbonate, ethyl methyl carbonate, diethyl carbonate, methyl propyl carbonate, ethyl propyl carbonate, and methyl isopropyl carbonate.

* * * * *